Figure 1:
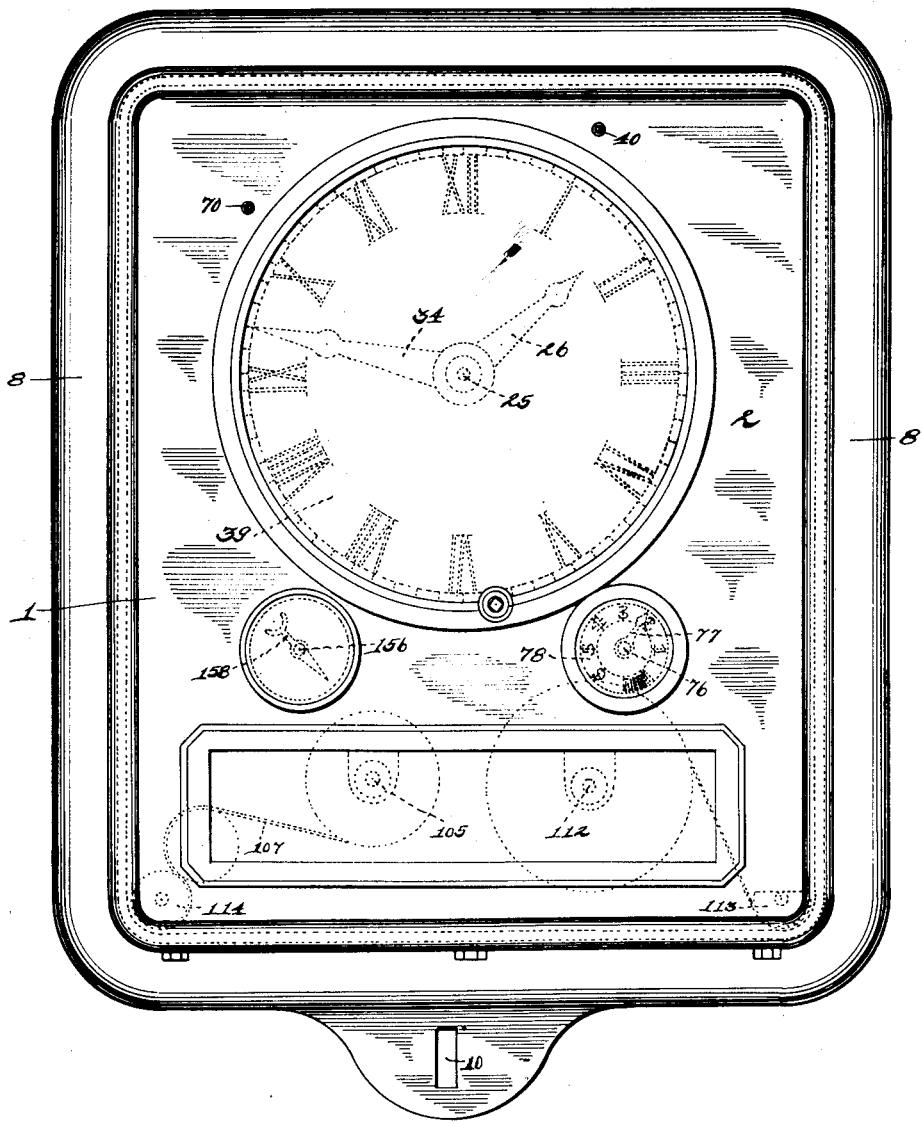

H. J. SUELZEN.
INDICATING DEVICE FOR VEHICLES.
APPLICATION FILED JUNE 8, 1910.

997,161.

Patented July 4, 1911.
12 SHEETS—SHEET 1.

Witnesses:
C. E. Wessels.
A. A. Olson.

Inventor:
Herman J. Suelzen,
By Joshua R. H. Potts
his Attorney.

H. J. SUELZEN.
INDICATING DEVICE FOR VEHICLES.
APPLICATION FILED JUNE 8, 1910.

997,161.

Patented July 4, 1911.
12 SHEETS—SHEET 2.

Witnesses:
C. E. Wessels.
A. A. Olson.

Inventor,
Herman J. Suelzen,
By Joshua R H Potts
his Attorney.

H. J. SUELZEN.
INDICATING DEVICE FOR VEHICLES.
APPLICATION FILED JUNE 8, 1910.
997,161.
Patented July 4, 1911.
12 SHEETS—SHEET 3.
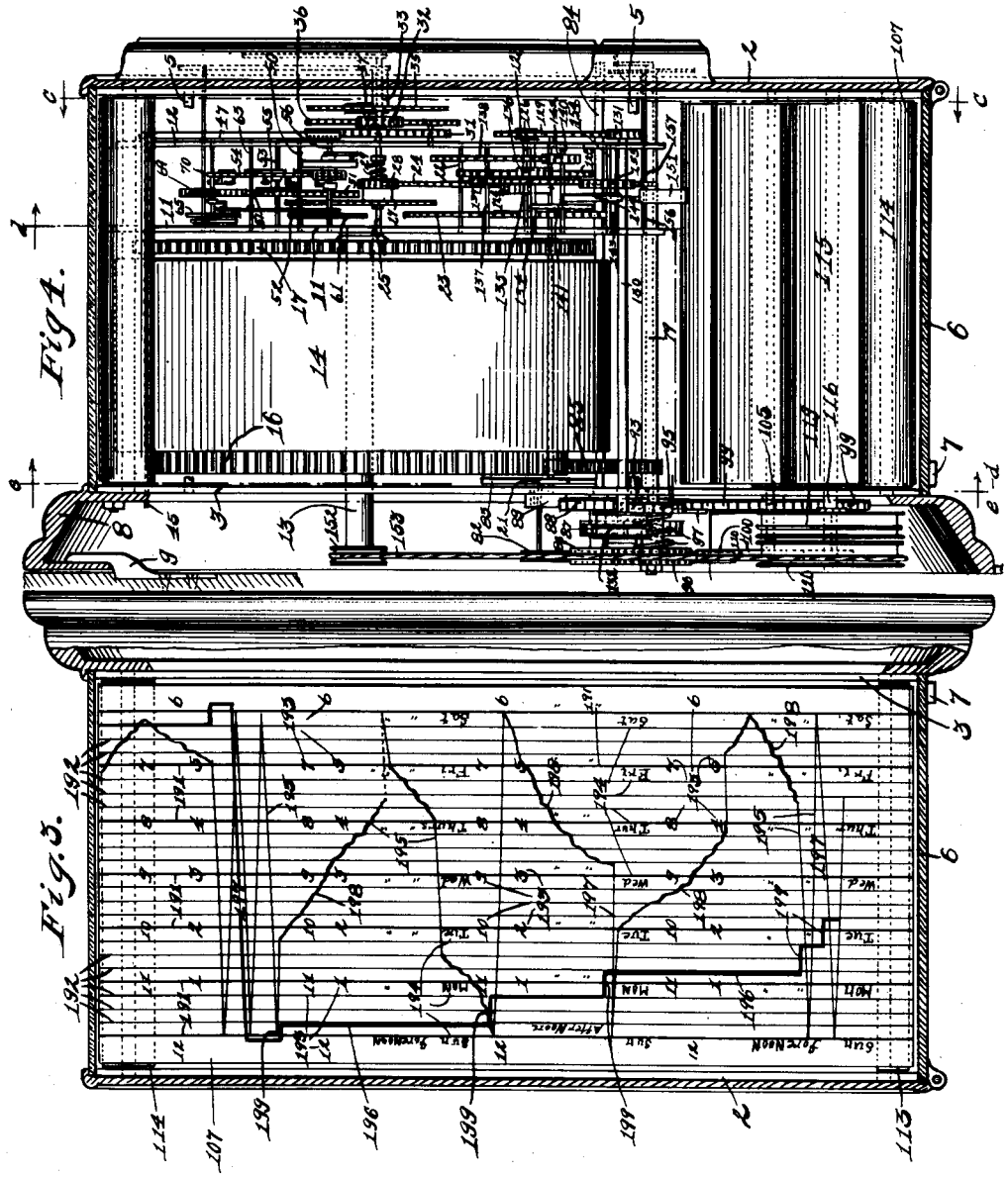
Witnesses:
E. E. Wessels.
A. A. Olson.
Inventor:
Herman J. Suelzen,
By Joshua R. H. Potts
his Attorney.

H. J. SUELZEN.
INDICATING DEVICE FOR VEHICLES.
APPLICATION FILED JUNE 8, 1910.

997,161.

Patented July 4, 1911.
12 SHEETS—SHEET 5.

Witnesses:
E. E. Wessels.
A. A. Olson.

Inventor:
Herman J. Suelzen,
By Joshua R. H. Potts
his Attorney.

H. J. SUELZEN.
INDICATING DEVICE FOR VEHICLES.
APPLICATION FILED JUNE 8, 1910.

997,161.

Patented July 4, 1911.
12 SHEETS—SHEET 6.

Witnesses:
E. E. Wesselo.
A. A. Olson.

Inventor:
Herman J. Suelzen,
By Joshua R. H. Potts
his Attorney.

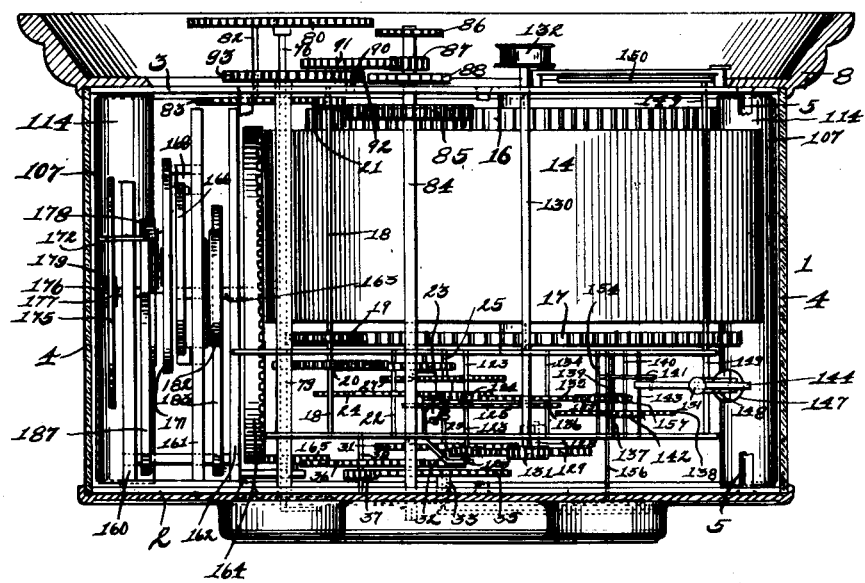

H. J. SUELZEN.
INDICATING DEVICE FOR VEHICLES.
APPLICATION FILED JUNE 8, 1910.

997,161.

Patented July 4, 1911.

12 SHEETS—SHEET 8.

Witnesses:
C. E. Wessels.
A. A. Olson.

Inventor:
Herman J. Suelzen,
By Joshua R. H. Potts
his Attorney.

H. J. SUELZEN.
INDICATING DEVICE FOR VEHICLES.
APPLICATION FILED JUNE 8, 1910.
997,161.
Patented July 4, 1911.
12 SHEETS—SHEET 9.
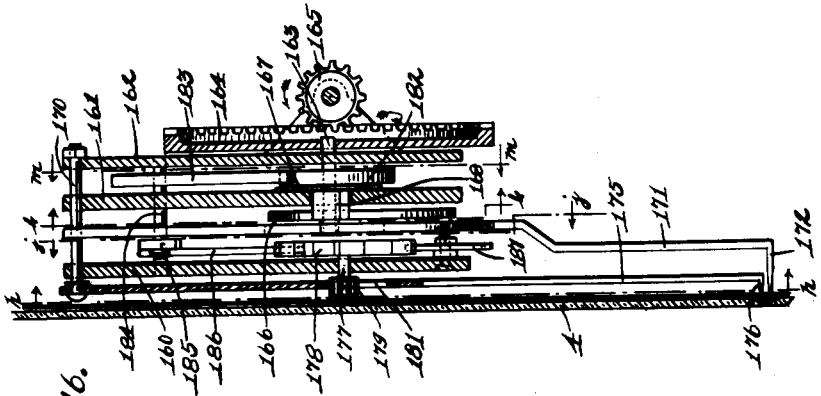
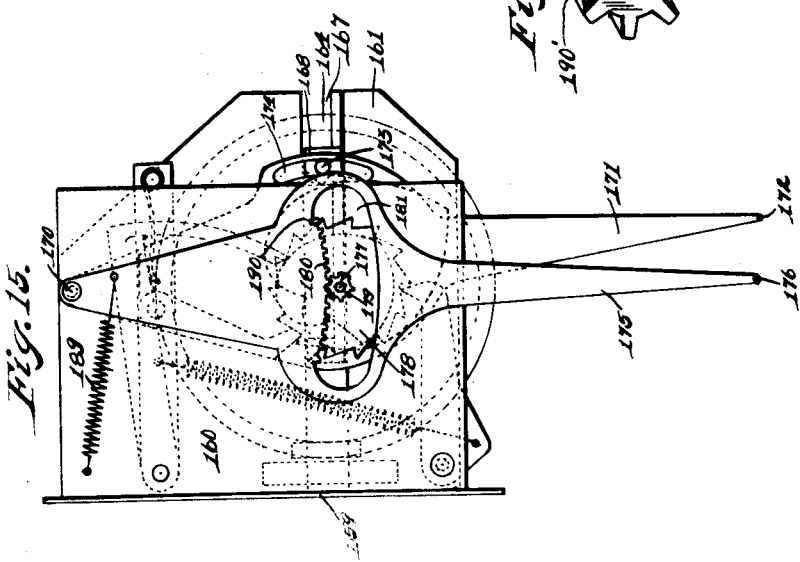
Witnesses:
E. E. Wessels.
A. A. Olson.
Inventor:
Herman J. Suelzen,
By Joshua R. H. Potts
his Attorney.

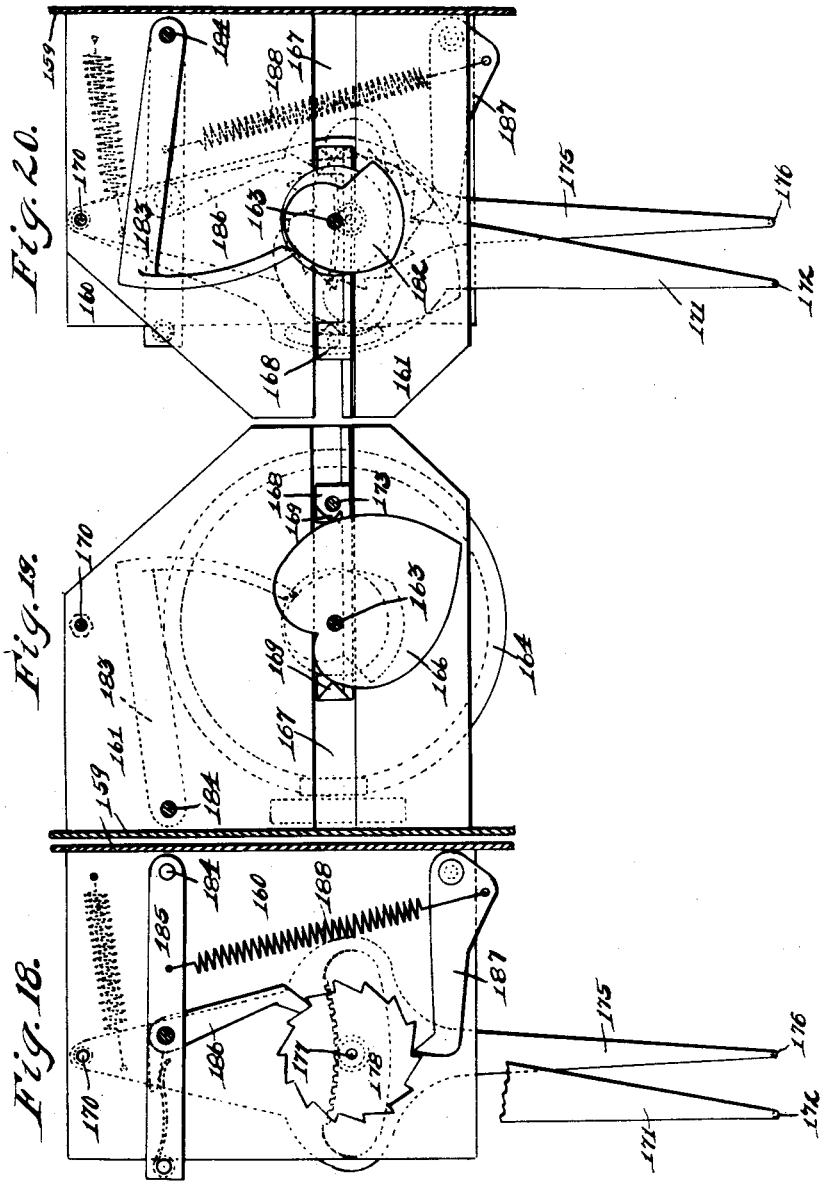

H. J. SUELZEN.
INDICATING DEVICE FOR VEHICLES.
APPLICATION FILED JUNE 8, 1910.
997,161.
Patented July 4, 1911.
12 SHEETS—SHEET 11.
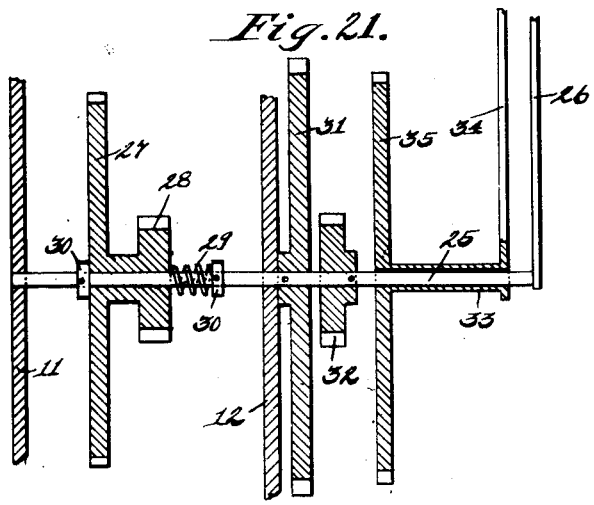
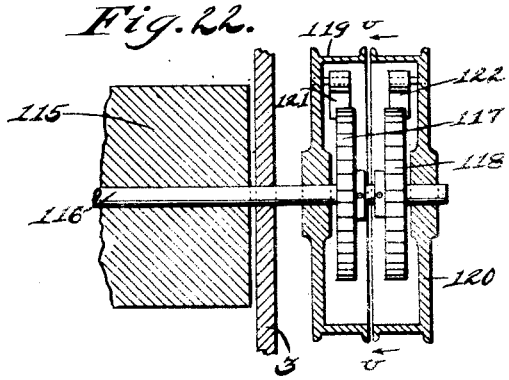
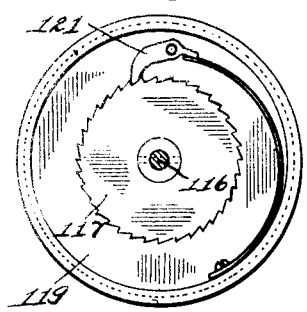
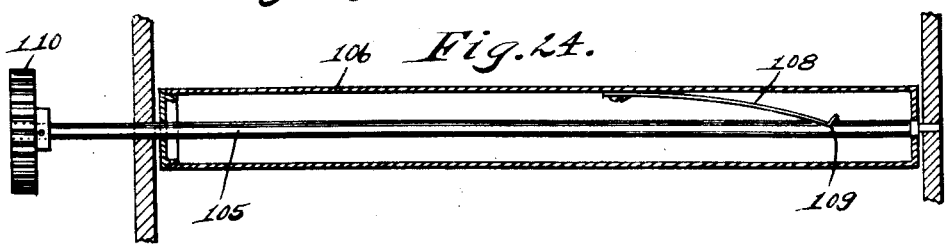
Witnesses:
E. E. Wessels.
A. A. Olson
Inventor:
Herman J. Suelzen,
By Joshua R. H. Potts
his Attorney.

H. J. SUELZEN.
INDICATING DEVICE FOR VEHICLES.
APPLICATION FILED JUNE 8, 1910.
997,161.
Patented July 4, 1911.
12 SHEETS—SHEET 12.
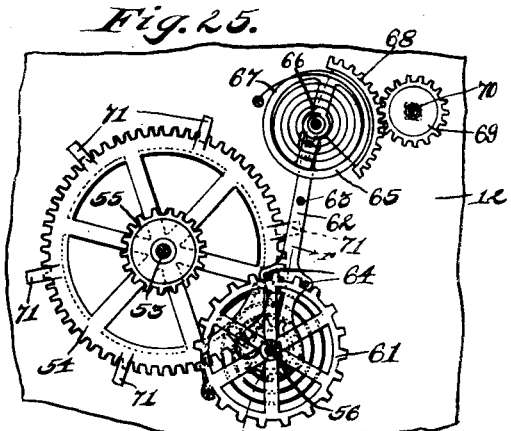
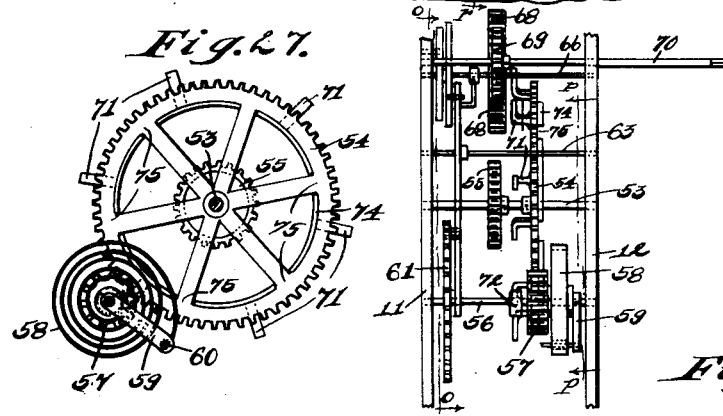
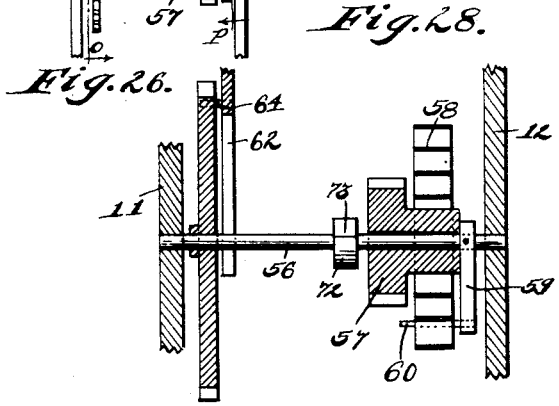
Witnesses:
C. E. Wessels.
A. A. Olson.
Inventor:
Herman J. Suelzen,
By Joshua R. H. Potts
his Attorney.

UNITED STATES PATENT OFFICE.

HERMAN J. SUELZEN, OF CHICAGO, ILLINOIS.

INDICATING DEVICE FOR VEHICLES.

997,161.  Specification of Letters Patent.  Patented July 4, 1911.

Application filed June 8, 1910. Serial No. 565,746.

*To all whom it may concern:*

Be it known that I, HERMAN J. SUELZEN, a citizen of the United States, residing at Chicago, county of Cook, and State of Illinois, have invented certain new and useful Improvements in Indicating Devices for Vehicles, of which the following is a specification.

My invention relates to improvements in devices designed for employment upon vehicles to indicate and record the exact time a vehicle is in operation, and also the exact intervals the same is idle or at rest; it being my object to provide means combined with a clock mechanism whereby a vehicle owner may ascertain the exact duration of time and the exact time of day his vehicle has previously been used.

A further object is the provision of a device of the character mentioned especially adapted for use upon motor cars or automobiles which will be of durable and economical construction and greatest efficiency in operation.

Other objects will appear hereinafter.

With these objects in view my invention consists in an indicating device for vehicles characterized as above mentioned and in certain details of construction and arrangement of parts all as will be hereinafter fully described and particularly pointed out in the appended claims.

My invention will be more readily understood by reference to the accompanying drawings forming a part of this specification, and in which—

Figure 2:
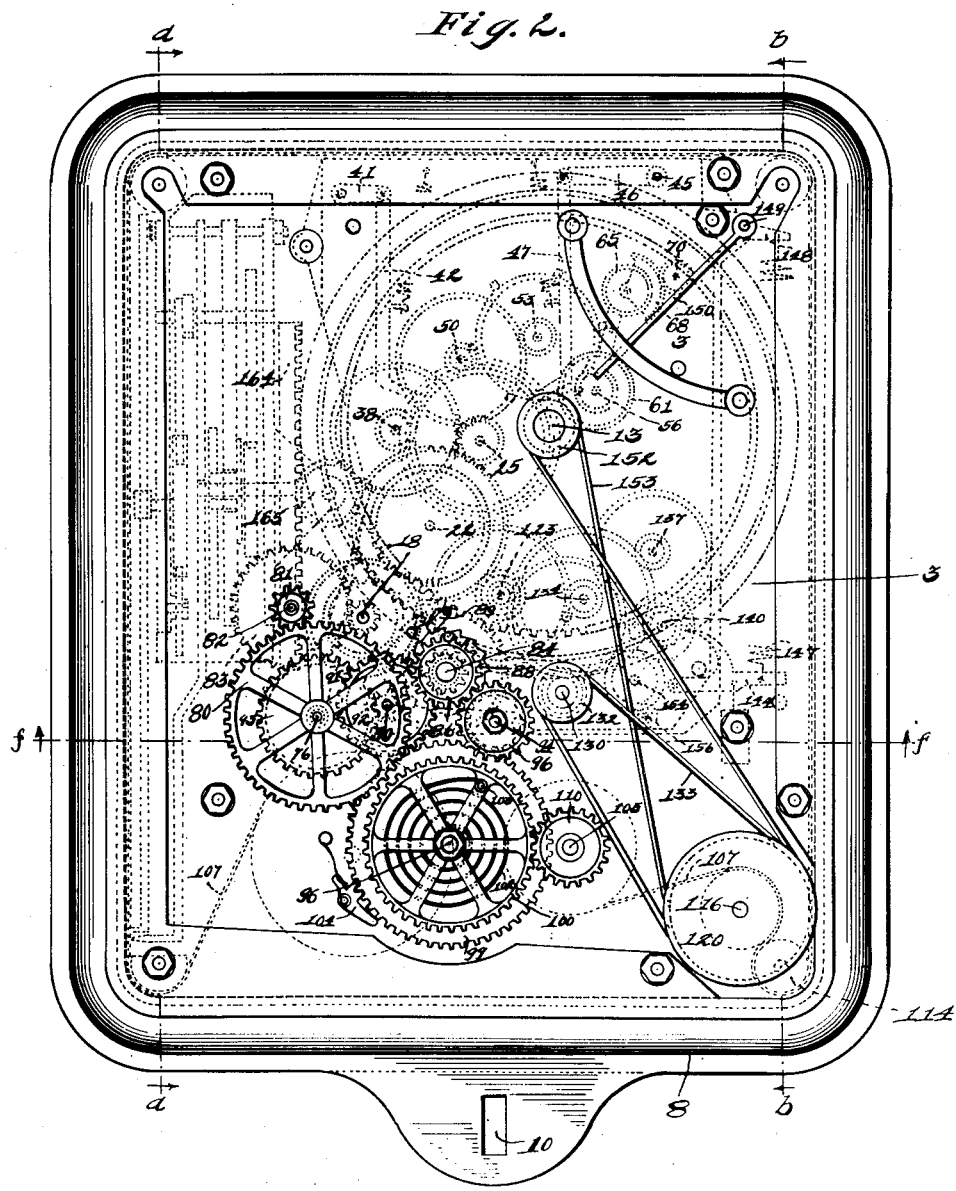
Figure 5:
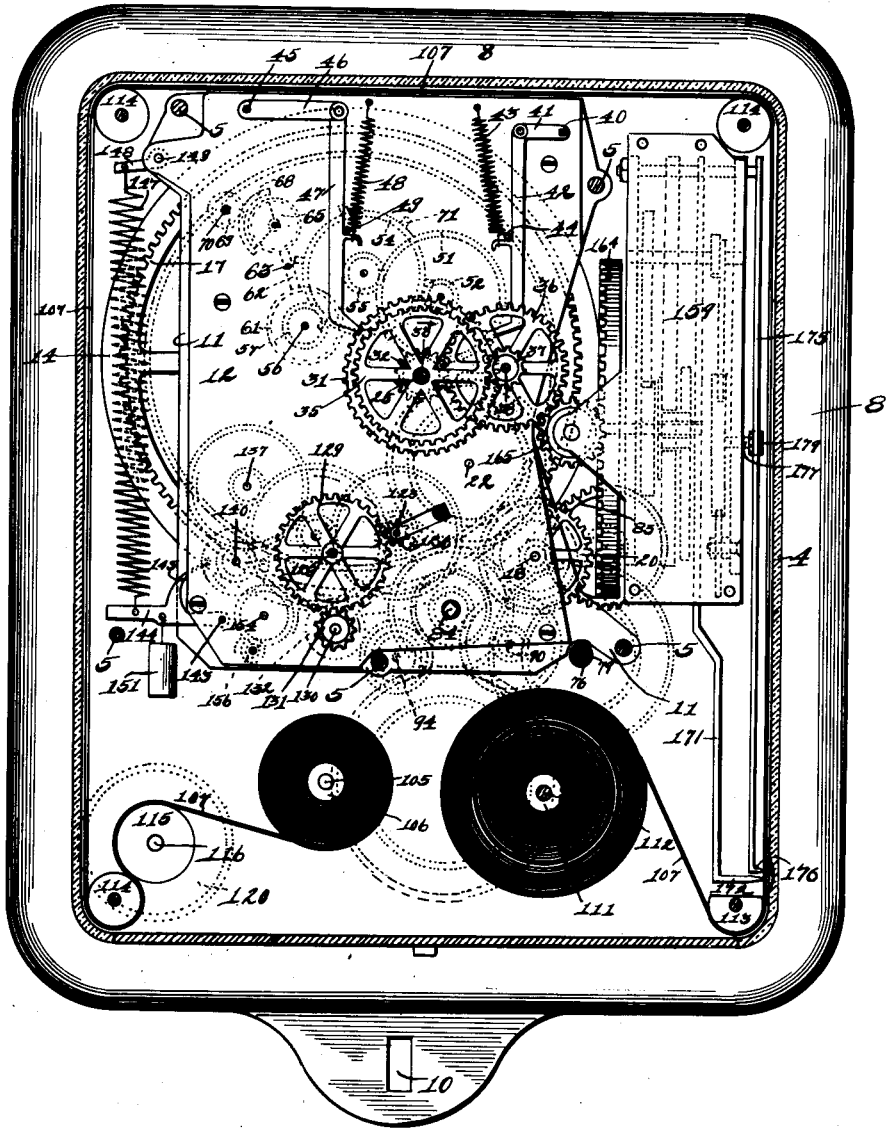
Figure 11:
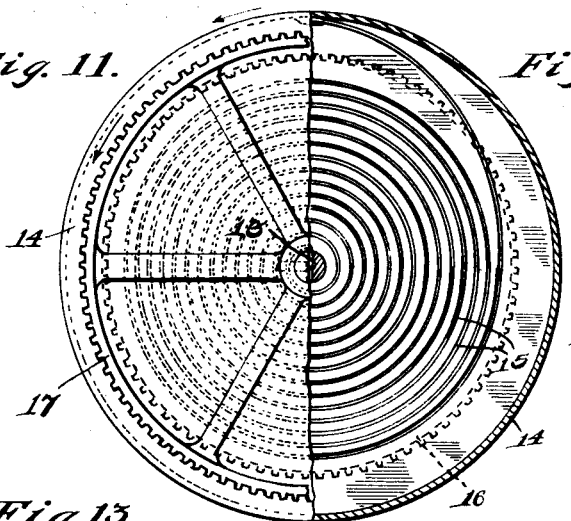
Figure 12:
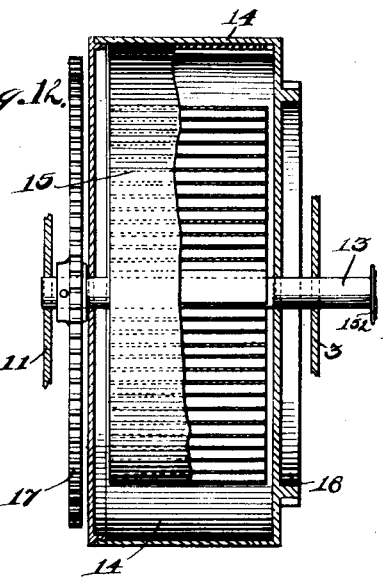
Figure 13:
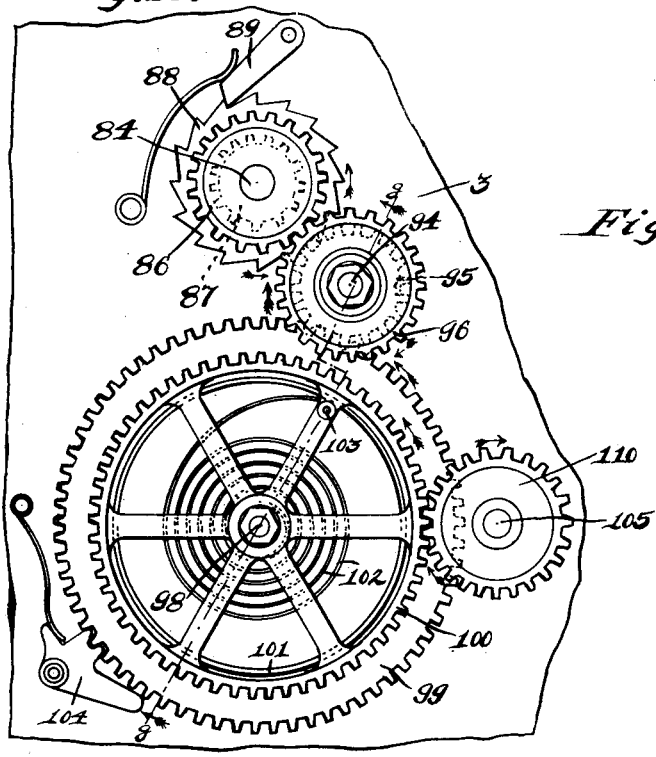
Figure 14:
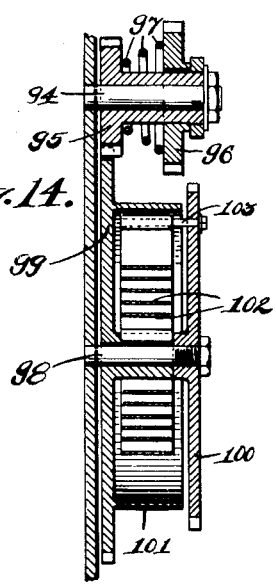

Figure 1 is a front elevation of my device in its preferred form, Fig. 2 is an elevation of the mechanism of my device with the rear part of the casing removed, Figs. 3 and 4 are vertical sections taken on substantially lines $a$—$a$ and $b$—$b$ respectively of Fig. 2, Figs. 5, 6 and 7 are vertical sections taken on substantially lines $c$—$c$, $d$—$d$ and $e$—$e$ respectively of Fig. 4, Fig. 8 is a horizontal section taken on substantially line $f$—$f$ of Fig. 2, Figs. 9 and 10 are sectional details of certain parts of the gearing embodied in the device, Fig. 11 is an enlarged sectional front elevation of the main spring barrel, the latter being broken away to expose the main spring therein, Fig. 12 is a central transverse section thereof, Fig. 13 is an enlarged front elevation of certain of the gears included in the device, Fig. 14 is a section on line $g$—$g$ of Fig. 13, Fig. 15 is an enlarged side elevation of the recording levers and the operating mechanism therefor detached, the same being a view looking from line $h$—$h$ of Fig. 16. Fig. 16 is a substantially central vertical transverse section thereof, Fig. 17 is an enlarged perspective view of one of the pinions included in the mechanism shown in Figs. 15 and 16, Figs. 18, 19 and 20 are vertical sections taken on substantially lines $j$—$j$, $k$—$k$ and $m$—$m$ of Fig. 16, Fig. 21 illustrates the central clock arbor enlarged with the gears mounted thereon shown in section, Fig. 22 is an enlarged sectional detail of the recording-strip feeding-roller, and the shaft upon which the same is mounted, Fig. 23 is a section taken on line $v'$—$v'$ of Fig. 22, Fig. 24 is an enlarged central section of the recording-strip receiving spool and the shaft carrying the same, Fig. 25 is an enlarged sectional detail of the clock balancing or governing mechanism embodied in the invention, taken on substantially the line $o$—$o$ of Fig. 26, Fig. 26 is a side elevation thereof, Fig. 27 is a sectional detail taken on line $p$—$p$ of Fig. 26, Fig. 28 is an enlarged detail section taken on line $r$—$r$ of Fig. 25, and Fig. 29 is a detail of a portion of the mechanism shown in Fig. 28.

Referring now to the drawings 1 designates the casing of the device which is substantially rectangular in form, comprising preferably metallic front and rear plates 2 and 3 respectively and a transparent peripheral wall 4 preferably formed of glass, the wall 4 being clamped between said parts 2 and 3 by bolts or connecting pins 5. The lower portion 6 of the wall 4, as clearly shown in Figs. 3 and 4, is hinged in order that ready access to the interior of the casing may be effected, said hinged portion being held in closed position by a suitable locking device 7. A flaring rim or flange 8 of the plate 3 is designed for engagement of a supporting bracket 9, as shown in Fig. 4, the lower end portion thereof being provided with a slot 10 for the admission of a suitable loop or the like, whereby, through the employment of a suitable locking device adapted to engage said loop or staple, the device may be securely locked upon a suitable supporting surface of the vehicle, such as the inner side of the dash board thereof.

Arranged within the casing 1, the same being spaced between the plates 3 and 4 in parallelly extending positions therewith, are plates 11 and 12.

13 indicates the main spring shaft which is at its respective ends journaled in the plates 3 and 11, as clearly shown in Figs. 4 and 12. Rotatably mounted upon said shaft is the main spring barrel 14 in which is housed the spiral main spring 15. The latter is secured at its inner extremity to said shaft, the same being coiled about the latter and being secured at its outer extremity to the peripheral portion of said barrel. Formed upon the rearward side of the barrel 14 is an annular gear 16 and fixed to the shaft 13 adjacent its forward end is a gear 17. Mounted in and extending through the plates 3, 11 and 12 is a shaft 18, the same being positioned below and extending parallelly with the shaft 13. Fixed to said shaft 18, as clearly shown in Fig. 8, are two gears 19 and 20 and a pinion 21, the gear 19 meshing with the gear 17. Positioned above the shaft 18, the extremities thereof being mounted in the plates 11 and 12, is a shaft 22 upon which are fixed gears 23 and 24, the gear 23 meshing with the gear 20 of the shaft 18. Positioned above the shaft 22 is a shaft 25 which extends through and is rotatably mounted in the plates 11, 12 and 2, as clearly shown in Fig. 4. The shaft 25 carries the hour hand 26 of the clock at its outer end and the integral driving gear 27 and pinion 28 which, as is ordinary in all clock mechanism, are frictionally connected with said shaft by means of the compression spring 29 and the collars 30, as clearly illustrated in Fig. 21. The pinion 28 meshes with the gear 24. Thus a driving connection between the hour hand and the main spring is established. Also arranged upon the shaft 25 is the gear 31 and the pinion 32 which are fixed thereto, a sleeve 33 being loosely mounted thereon adjacent the outer end thereof, said sleeve carrying the minute hand 34 of the clock at its outer end and the gear 35 at its inner end. Through the medium of the multiplying idler gear 36 and pinion 37 which are fixed to a rotatably mounted shaft 38, and which mesh respectively with the pinion 32 and the gear 35, the sleeve 33 and hence the hand 34 is driven by the shaft 25 at twelve times the speed of the latter or of the hour hand 26 carried thereby. The hands 26 and 34 coöperate with the clock dial 39 arranged upon the front side of the plate 2 to constitute a time piece, said dial being shown as covered with a transparent glass coverplate.

Rockingly mounted in the plates 2 and 12 adjacent the upper edge thereof is a shaft 40, the same projecting through the plate 2 and being squared at its forward exterior end, whereby the same may be rocked by means of a key. Carried by said shaft is a rocker arm 41 to which is secured the upper extremity of a depending pawl 42, the latter being offset at its lower end for engagement of the teeth of the gear 31 (clearly shown in Fig. 5) and whereby, by simply oscillating the shaft 40, said gear may be rotated in order to effect the forward or clockwise movement of the clock hands for setting the same. A tension spring 43 is arranged to normally hold the pawl 42 against a stud 44 projecting from the plate 12, said stud serving as a stop to limit the upward movement thereof. A shaft 45 similar to the shaft 40 is rockingly mounted in the plates 12, 11 and 2, the same extending through the latter, the exterior portion thereof being squared for the reception of a key whereby oscillation thereof may be effected. A rocker arm 46 and a depending pawl 47 are carried by the forward end of said shaft, said pawl being adapted to engage the gear 31 at the side thereof opposite to that engaged by the pawl 42, and whereby retrograde or counter-clockwise movement of the clock hands for setting the same may be effected. A tension spring 48 normally holds said pawl in elevated and inoperative position against a stop stud 49 projecting from the plate 12.

It will be noted that the counter-clockwise movement of the hands may be effected only from the back side of the device, or, only when the device is detached from its support, thus a safeguard against such adjustment of the hands, as by the vehicle driver, is provided; since, with this construction, only the person holding the key to the lock whereby the device is locked in position (which person will be the owner of the vehicle or some person by him authorized) may so adjust the hands. The purpose of this spring will become evident as the description proceeds.

Rotatably mounted in and extending between the plates 11 and 12 above the shaft 25 is a shaft 50 upon which is fixed a gear 51 and a pinion 52, the latter meshing with the gear 27 on the shaft 25. Also mounted in the plates 11 and 12 is a shaft 53 upon which are secured a gear 54 and a pinion 55, the latter meshing with the gear 51 on the shaft 50. Positioned slightly below the shaft 53 is a shaft 56 also mounted in the plates 11 and 12, the same being shown in the figures from 25 to 29 inclusive. Said shaft 56 carries a loose pinion 57 which meshes with the gear 54. Coiled upon an extended hub portion of said pinion is a spiral spring 58 whose inner extremity is secured to said pinion and whose outer extremity is secured to a pin 59 carried at the outer end of an arm 60 fixed to and extending from said shaft 56; the arrangement being such that the rotation of said gear 54 causes the winding of said spring. Also fixed to the shaft 56 is an escapement wheel 61.

62 indicates the balance lever which is fulcrumed upon a bar 63, the same being provided with pallets 64 which engage the teeth of the wheel 61, permitting of intermittent rotation of the latter upon oscillation of said lever.

65 indicates an ordinary balance wheel mounted upon a shaft 66, and 67 the coiled spring coöperating therewith; the upper end of the lever 62 being so connected with said balance wheel that oscillation of the latter causes the oscillation of said lever. The inner end of said spring is connected to a segmental rack 68, whereby, through the medium of the gear 69 meshing with said rack, and which gear is mounted upon a shaft 70, the tension of said spring and hence the oscillations of said balance wheel may be regulated to effect the regulation of the speed of the clock mechanism connected therewith. This, however, is an old and well-known expedient. The shaft 70 projects through the front plate 2 and is preferably squared so that adjustment thereof may be effected by means of a key.

Formed upon the rearward side of the gear 54 is a plurality of projecting equally spaced fingers 71. Fixed to the shaft 56 is a disk 72 so arranged as to be adapted to act as a stop for fingers 71, said disk being mutilated or slotted as at 73 at one side, so that, when said slot is registering with the fingers 71, the passage of the latter beyond said disk, and hence the rotation of the shaft 53 will be permitted. With this provision it will be seen that the gear 54 and hence the entire train of gears connected therewith will be intermittently stopped and rotated, the gear 58 being intermittently wound and unwound it being wound when the gear 54 is permitted to rotate and unwound when said gear is inert, the winding being effected by reason of the greater speed at which the pinion 57 is rotated by the gear 54 when released over that at which the escapement mechanism permits the shaft 56 to travel. With this arrangement it will be seen that the condition of the spring 58 and hence the retarding force exerted thereby through the pinion 57 upon the clock mechanism will be constant and uniform, and whereby a time piece of greater accuracy is provided. With this construction, however, should the main spring run down and the mechanism connected therewith stop running, the spring 58 would evidently also run down. In order to prevent this the gear 54 is formed upon its front side with a projecting annular flange 74 provided at intervals intermediately adjacent of the fingers 71 with slots or openings 75. Said flange traverses the path of the outer end of the pin 60 carried by the arm 59 permitting of rotation of the latter only when the slots 75 therein are registering with said pin; said slots being so positioned that the same will be in registration with said pin only when the slot 73 in the disk 72 is positioned to permit of the passage of the fingers 71. With this arrangement then, should the main spring run down and the mechanism connected therewith stop in any position except that in which the slots 75 of the gear 54 are in registration with the pin 60, the latter will abut the flange 75 and thereby prevent further uncoiling of the spring 58 until the main spring has been wound and the mechanism connected therewith again set in motion.

In order that the condition of the main spring 15 may be readily ascertained a shaft 76 is provided, the latter extending through and being mounted in the plates 2, 12, 11 and 3, as clearly shown in Figs. 4 and 8. Fixed to the forward extremity of the shaft 76 is an exteriorly positioned hand 77 which is adapted to coöperate with the dial 78 secured to the forward extremity of a sleeve 79 and which is loosely mounted upon said shaft, as clearly shown in Fig. 9; said dial being provided on its front side with characters to indicate to what degree the spring is wound, as $\frac{1}{8}$, $\frac{3}{8}$ or $\frac{6}{8}$, etc., the operative connection of said sleeve and shaft with the main spring shaft and barrel being described in the following. Fixed to the rearward extremity of the shaft 76 is a gear 80 which meshes with a pinion 81 carried by a stud shaft 82, a gear 83 also carried by the latter and meshing with the pinion 21. Thus an operative connection is established between the shaft 76 and the main spring shaft 13.

Mounted in and extending through the plates 2, 12, 11 and 3 is a shaft 84 (clearly shown in Fig. 8) upon the rearward end of which are fixed a gear 85 which meshes with the gear 16 on the main spring barrel, a second gear 86, a pinion 87 and a ratchet wheel 88, said shaft being squared at its forward exteriorly projecting extremity for engagement by a key whereby the barrel 14 may be rotated in order to effect the winding of the spring 15. A spring pressed pawl 89 pivotally mounted upon the plate 3 is adapted to coact with the ratchet wheel 88 to prevent retrograde movement of the shaft 84 and hence of the main spring barrel 14, driving from the main spring being, as will be observed, effected through the medium of the gear 17 of the main spring shaft 13. Mounted in the plate 3 intermediate the shafts 76 and 84 is a stud shaft 90 upon which are fixed a gear 91 which meshes with the pinion 87, and a pinion 92 which meshes with a gear 93 fixed to the rearward extremity of the sleeve 79. Thus an operative connection is established between the gear 16 on the main spring barrel and the sleeve 79 which carries the dial 78. With this arrangement then, it will be seen that as the main spring unwinds, the hand 77 will be gradually reversely rotated, the gearing connecting said hand and main spring shaft being such that to the complete rotary movement imparted to said main spring shaft by the main spring after the latter has been completely wound up, said hand will be turned through but one revolution. Also the gearing connecting said dial and said spring barrel is such that to the complete rotary movement given said barrel in effecting the complete winding of the spring, said dial will be turned through but one revolution. Hence, with this construction, it will be seen that as the main spring unwinds the dial 78 will remain stationary, the hand 77 only rotating, the latter co-acting with the characters upon said dial to at all times indicate the condition of the spring. In winding said spring, the hand 77 will remain relatively stationary, the dial 78 in this event being rotated to position the same in initial position relative to the hand 77.

Mounted in the plate 3 adjacent the shaft 84 (as clearly shown in Figs. 13 and 14) is a stud shaft 94 upon which is loosely mounted a gear 95. This gear is formed with a reduced forwardly extending hub portion, upon which is loosely mounted a second gear 96, the latter meshing with the gear 86. The gears 95 and 96 are frictionally connected through the medium of a coiled compression spring 97 interposed between the same. Also mounted in the plate 3 adjacent the shaft 94 and below the same, is a stud shaft 98 upon which are loosely mounted two gears 99 and 100. The gear 99 is provided with an annular projecting flange 101 in which is arranged a spiral spring 102, the latter being secured at its inner extremity to a central extension or hub of said gear and at its outer end to a pin 103 secured in and projecting from the gear 100. A spring pressed pawl 104 engaging the teeth of the gear 99 is arranged to prevent retrograde movement of said gear. Arranged adjacent the shaft 98, the same being loosely mounted at its respective ends in the plates 2 and 3 is a shaft 105. Arranged upon said shaft (as clearly illustrated in Fig. 24) is a hollow spool 106 upon which, when the device is in operation, is coiled one end of a record-strip 107. Said spool is locked against rotary movement upon said shaft by reason of its forward end wall being formed to snugly engage the squared outer end of said shaft. Said spool is yieldingly locked against longitudinal movement upon said shaft by means of the leaf spring 108 which is offset at its front end for introduction of a notch 109 formed in said shaft. The arrangement is such that detachment or removal of said spool, in order to effect a change of record-strip coils, may be effected by simply withdrawing said shaft, since in such event, said spool may be removed through the opening at the lower side of the casing. Fixed to the rearward end of said shaft is a gear 110 which meshes with the gear 100, as clearly shown in Fig. 13. The arrangement, as will be observed, is such that the spring 102 will normally tend to rotate the spool 106 in a direction in which the strip 107 will be coiled thereon, and whereby said strip will be coiled upon said spool at the rate the same is fed through the device by means to be presently described. Further, the arrangement is such that winding of the main spring will effect the simultaneous winding of the spring 102. By the provision of the frictional connection between the gears 95 and 96, upon the spring 102 becoming wound, the gear 96 will slide upon the gear 95 and further permit of complete winding of the main spring without effection to the spring 102. The opposite end of the record-strip 107 is coiled upon a paying out spool 111 which is carried upon a shaft 112, which, as shaft 105, is loosely and detachably mounted in the plates 2 and 3, said spool being mounted upon said shaft in a manner similar to the mounting of the spool 106 upon the shaft 105. Intermediate said spools 106 and 111 said strip passes around a stationary guide bar 113 and rollers 114 which are mounted at their respective corners of the casing so that the strip in passing therearound will be positioned in close proximity with the inner surface of the transparent wall 4 of the casing. Said strip also passes around a feed roller 115 which is positioned for coöperation with the lower roller 114 to govern the speed of feeding of the strip through the mechanism. Roller 115 is formed of a suitable frictional material and is fixed to a shaft 116 whose respective extremities are mounted in plates 3 and 11′, said shaft projecting through the plate 3 and being provided upon its exteriorly projecting end portion with two ratchet wheels 117 and 118 which are rigidly secured thereto (see Figs. 22 and 23). Loosely mounted upon said shaft are hollow pulleys 119 and 120 which inclose the ratchet wheels 117 and 118 respectively. Mounted in said pulleys 119 and 120 are spring pressed pawls 121 and 122 respectively whereby operative connections between said pulleys and the shaft 116 are established.

Figure 6:
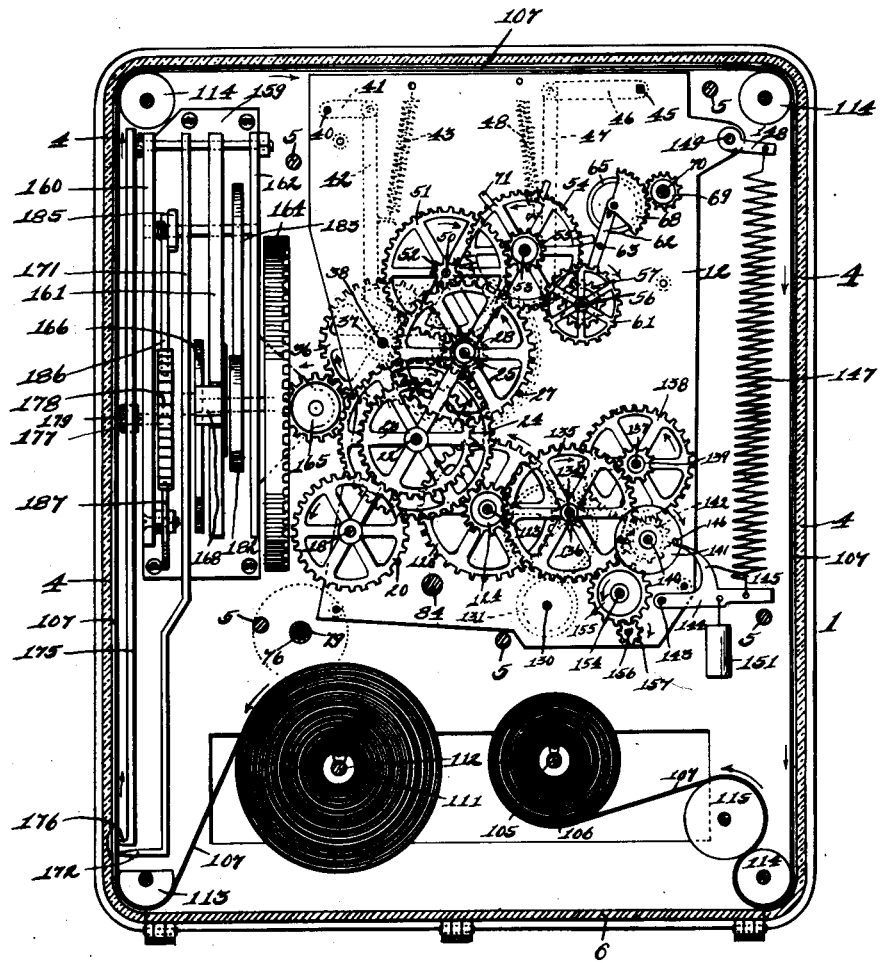
Figure 7:
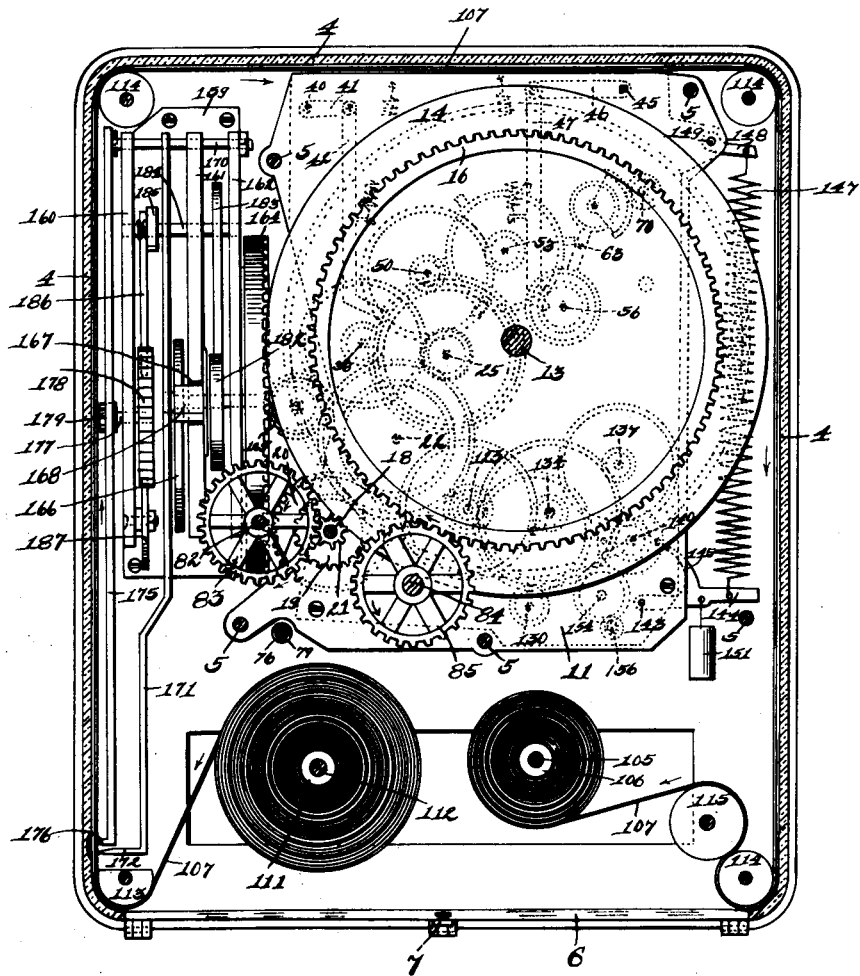

Mounted in the plates 11 and 12 adjacent the shaft 22 is a shaft 123, clearly shown in Figs. 6 and 10, upon which is mounted a loose gear 124, a fixed gear 125 and a fixed pinion 126; the gears 124 and 125 and hence the former and the shaft 123 being frictionally connected by means of a coiled compression spring 127 interposed between said gears. The gear 124 meshes with the gear 24 of the shaft 22. Mounted in the plate 12 adjacent the shaft 123 (see Fig. 5) is a stud shaft 128 upon which is carried an idler gear 129. Mounted in the plates 12, 11 and 3 (see Figs. 4 and 8) adjacent the shaft 128, the same projecting through the plate 3, is a stud shaft 130 upon which is fixed a gear 131 meshing with the gear 129, and a channel pulley 132 which is positioned upon the rearward exteriorly projecting end portion thereof. A suitable friction belt 133 running over the pulleys 132 and 119 establishes an operative connection between said pulleys. Mounted in the plates 11 and 12 adjacent the shaft 123 (see Fig. 6) is a shaft 134 upon which is fixed a gear 135 and a pinion 136, the latter meshing with the gear 125. Also mounted in the plates 11 and 12 adjacent the shaft 134 is a shaft 137 upon which is fixed a gear 138 and a pinion 139, the latter meshing with the gear 135. Also mounted in the plates 11 and 12 is a shaft 140 upon which is fixed an escapement wheel or disk 141 and a gear 142, the latter meshing with the gear 138. Pivotally secured at 143 to the plate 12 adjacent the wheel 41, is a lever or detent 144. Said lever is provided with an upwardly and inwardly projecting curved arm 145 which is adapted to traverse the path of pins 146 spaced upon and projecting from the wheel 41, to prevent rotation of the latter. A tension spring 147 is secured at its lower end to the free end of said lever 144 and at its upper end to the outer end of an arm 148 secured to and projecting from a shaft 149 mounted in the plates 12, 11 and 3. The shaft 149 projects exteriorly of the plate 3 and is provided with an arm 150 whereby the same may be rotated in order to adjust the tension of said spring. Carried by the lever 144 is a counter-weight 151. The arrangement is such that the lever 144 will normally be held in a position in which the same will prevent rotation of the escapement wheel 141, but, upon any vibration of the device, such as is caused by throbbing of the engines of the vehicle or simply the moving of the vehicle upon which the same is arranged, said lever will be caused to oscillate and to thereby permit of an irregular escapement of said wheel. Therefore, with the arrangement described, operation of the train of gears connected with the gear 125 and hence driving of the record-strip through the medium of the plate 133 will be permitted only when the device is vibrated and hence, therefore, only when the vehicle upon which it is arranged is in operation.

Carried by the rearward extremity of the main spring shaft 13 is a channel pulley 152 which is connected by a suitable friction plate 153 with the pulley 120 of the feed roller shaft 116. This construction, as will be observed, is such that the pulley 120 will be continually and uniformly driven but at an exceedingly low rate of speed. The pulley 132, as will be observed, is so connected that, when permitted to rotate, the same will drive pulley 119 and hence the roller 115 at a speed considerably greater than that imparted thereto by the pulley 120. Hence, therefore, when the vehicle is not in operation, the record-strip will be fed through the device at a comparatively low uniform speed, and when the vehicle is in operation said strip will be fed at an increased variable speed.

Mounted in the plates 11 and 12 below and adjacent the shaft 136 is a shaft 154 (see Fig. 6) upon which is carried an idler gear 155. Mounted in said plates adjacent the shaft 154, the same also extending through the plate 2, is a shaft 156 to which is fixed a pinion 157, the latter meshing with the gear 155. The forward end of said shaft 156 is provided with an exteriorly projecting hand or other desired form of indicator 158. This provision is made simply for the purpose of indicating when the gearing controlled by the escapement lever 145 is in operation since, with this construction, when the said mechanism is in operation, said hand will be rotated.

Mounted upon and rigidly secured to the inner side of the front plate 2 at one side thereof is a base plate 159 inwardly projecting from which are three spaced parallelly extending supporting or bearing forming plate portions 160, 161 and 162, clearly illustrated in Figs. 15 to 20 inclusive. Mounted substantially centrally in the plates 161 and 162 is a transversely extending shaft 163 upon the outer end of which is fixed a crown gear 164. An idler gear 165, as clearly shown in Figs. 5 and 6, establishes an operative connection between the gears 164 and 36. Fixed to the inner end of the shaft 163 is a heart cam 166. Formed in the plate 161 is a horizontally extending slot 167 in which is reciprocally mounted a block 168 having projecting fingers 169 which engage diametrically opposite points upon the periphery of said cam. This arrangement, as will be observed, is such that with each rotation of said cam, said block will be forced through one complete reciprocation. Pivotally secured at its upper end to a transversely extending pin 170 arranged in the upper ends of the plates 160, 161 and 162 substantially midway the plates 2 and 3 is a depending lever 171, the lower end 172 of the latter being offset and pointed, as clearly shown in Figs. 5 and 6, for contact with the inner surface of the record-strip 107. Said lever is connected intermediate its extremities to the block 160, such connection being effected through the medium of a pin 173 projecting from said block, and which pin engages an arcual slot 174 formed in said lever. With this arrangement it will be seen that upon reciprocation of the block 168, as before mentioned, corresponding oscillatory movement will be imparted to the lever 171, said lever being of such length and so arranged that the lower end thereof will, upon such oscillation, traverse substantially the entire width of the strip 107. The shaft 163 is so geared to the main driving spring of the clock that said shaft and hence the cam 166 will be turned through one revolution in twelve hours, and whereby one complete oscillatory movement in one direction or half of one complete oscillatory movement will be imparted to said lever every six hours.

Arranged upon the outer side of the plate 160, the same being also pivotally secured at its upper extremity to the pin 170, is a second depending lever 175, the lower end 176 of the latter being also offset and pointed, as indicated, for engagement of the inner surface of the strip 107, said points 172 and 176 being positioned in close proximity with each other. Rotatably mounted substantially centrally in the plate 160 is a stud shaft 177 to one end of which is fixed a ratchet wheel 178, and to the opposite end thereof a pinion 179, the latter meshing with a segmental rack 180 formed upon the upper edge of an arcual slot 181 formed in the lever 175. Said pinion and said rack are provided with the same number of teeth so that one revolution of said pinion will impart one complete oscillatory movement in one direction to said lever, the latter being so arranged that the same, upon being oscillated, will traverse substantially the entire width of the strip 107. Oscillatory movement of the lever 175 is therefore effected through rotation of the shaft 177. Fixed to the shaft 173 intermediate the plates 161 and 162 is an irregular cam 182, the same being of such a peripheral shape as to be adapted, when rotated, to impart a gradual rise and sudden fall movement to the cam lever 183 which engages at its free end with the periphery of said cam. The opposite end of said lever is fixed to a rock shaft 184 mounted in the plates 160, 161 and 162 adjacent their inner ends. Arranged between the plates 160 and 161 is an arm 185 which is secured at one end to the shaft 184. Carried by said arm is a depending spring pressed pawl 186 the lower end of which engages the teeth of the ratchet wheel 178, and whereby the same is adapted, upon oscillation of the shaft 184 and arm 185, to effect the rotation of said ratchet wheel. A detent pawl 187 is arranged, as clearly shown in Fig. 18, to prevent retrograde movement of said ratchet wheel. The pawls 186 and 187 are connected by a tension spring 188.

With this arrangement it will be seen that upon each rotation of the shaft 163, the arm 184 and hence the pawl 186 through the medium of the cam 182 and spring 188 will be oscillated to cause a partial rotation of the ratchet wheel 178 and consequently slight oscillation of the lever 175. The construction is such that with each such oscillation of said arm 185, said ratchet wheel will be rotated the distance of one of the teeth thereof, said rachet, as shown, being provided with fourteen teeth so that with each oscillation of said arm, or every twelve hours, the same will be rotated through one-fourteenth of a revolution, and hence the lever 175 through one-fourteenth of its extent of oscillation. Intermediate these periods of movement of said lever, the same will, as observed, remain stationary. The pinion 179 is, as clearly shown in Fig. 17, mutilated at one side, more precisely one and one-half teeth thereof are cut away, this provision being made so that, when the lever 175 has reached the extremity of its movement, as imparted thereto by said pinion, the same will be released for returning to normal position by a spring 189. A projecting tooth 190 provided at the near extremity of said rack, will, upon further rotation of said pinion, be engaged by the mutilated or one-half tooth 190' of the latter to effect the oscillation of said lever anew.

The exposed side of the strip 107, as clearly shown in Fig. 3, is provided with seven equally spaced longitudinally extending heavy lines 191 and a plurality of equally spaced intermediate lighter lines 192. The lines 191 are, at intervals, numbered as at 193, the outermost being numbered 12 and 6, and the intermediate being numbered from 1 to 5 and from 7 to 11; said numbers, and hence the lines 191, designating hours of day, the lines 192 indicating fractions of hours. Said lines 191 are also lettered as at 194 to successively indicate the days of the week, corresponding sides of said lines 191 being designated as "forenoon" and the opposite sides thereof as "afternoon." The front side of said strip is provided with a coating of transparent paraffin, the reverse side being preferably blackened or otherwise darkly colored.

With this arrangement it will be found that as lever points 172 and 176 contact or scratch the back side of the record-strip and traverse the same, the operative front at the side will be ruptured or cracked opposite the points of contact of said lever points to form white lines 195 and 196 respectively upon said strip, the blackened back side of said strip setting said lines out with great distinctness. The lines 196 will, at periods when the vehicle is silent, be regular practically straight substantially transversely extending lines, such as indicated at 197, since in this event the record-strip is moved, as before described, very slightly; and said line, when the vehicle is in operation, being irregular and obliquely extending as at 198, since in this event the strip, as before described, is fed through the device at an increased irregular speed.

The duration of an oscillation of the lever 196 being six hours, as before described, and the lines 191 and 192 being arranged and horologically designated accordingly, it is evident that the duration of the periods of rest and operation of the vehicle, and the exact time of day at which they occur, may be readily ascertained. The lever 176 is so arranged and adjusted that the operation thereof will occur at exactly twelve o'clock noon and midnight, so that at twelve o'clock noon and midnight short transversely extending steps or portions 199 will be described thereby, the markings described at such periods at twelve o'clock noon being positioned intermediate the lines 191 and those occurring at twelve o'clock midnight being positioned to traverse said lines. With this arrangement it will be seen that the days of the week will also be indicated upon the strip, and whereby the exact day together with the exact time of day at which the periods of rest and of motion of the vehicle occur, will be recorded. By forming the wheel 4 transparent, the record for a considerable length of time, several days, will always be exposed to view.

With a device of the construction as shown and described, it will be seen that one of great efficiency in operation and one of a durable and economical construction will be provided.

While I have shown what I deem to be the preferable form of my device I do not wish to be limited thereto as there might be various changes made in the details of construction and the arrangement of parts described without departing from the spirit of the invention comprehended within the scope of the appended claims. And although I have designed my device with special reference to its use upon vehicles, the same may be employed in any other connection to which it is applicable.

Having described my invention what I claim as new and desire to secure by Letters Patent is:

1. In a device of the class described, the combination of a casing; a clock mechanism; a record-strip mounted in said casing adapted to be fed therethrough; means for feeding said strip, said means being adapted upon the subjection of the device to vibration to feed said strip at a greater rate of speed than when the device is not subjected to vibrations; recording means adapted to act upon said strip; and an operative connection between said recording means and said clock mechanism, substantially as described.

2. In a device of the class described, the combination of a casing; a clock mechanism; a movable record-strip; means for feeding said strip, said means being adapted upon the subjection of the device to vibration to feed said strip at a greater rate of speed than when the device is not subjected to vibrations; and recording means adapted for operation upon said strip, substantially as described.

3. In a device of the class described, the combination of a casing; a clock mechanism; a movable record-strip; means for feeding said strip; said means being adapted upon the subjection of the device to vibration to feed said strip at a greater rate of speed than when the device is not subjected to vibrations; and uniformly operating recording means adapted for operation upon said strip transversely thereof, substantially as described.

4. In a device of the class described, the combination of a casing; a clock mechanism; a movable record strip; means for feeding said strip, said means being adapted upon the subjection of the device to vibration to feed said strip at a greater rate of speed than when the device is not subjected to vibrations; recording means adapted to traverse said strip; and an operative connection between said recording means and said clock mechanism, substantially as described.

5. In a device of the class described, the combination of a casing; a clock mechanism mounted in said casing; a movable record-strip mounted in said casing and visible from without; means for feeding said strip, said means being adapted upon the subjection of the device to vibration to feed said strip at a greater rate of speed than when the device is not subjected to vibrations; recording means adapted to traverse said strip; and an operative connection between said means and said clock mechanism, substantially as described.

6. In a device of the class described, the combination of a casing; a clock mechanism mounted in said casing; a movable record-strip mounted in said casing and visible from without; means for feeding said strip, said means being adapted upon the subjection of the device to vibration to feed said strip at a greater rate of speed than when the device is not subjected to vibrations; two recording levers adapted for operation upon and transversely of said strip; and an operative connection between said levers and said clock mechanism whereby one of said levers will be constantly oscillated and the other lever intermittently operated, substantially as described.

7. In a device of the class described, the combination of a casing; a clock mechanism mounted in said casing; a movable record-strip mounted in said casing and visible from without; means in operative connection with said clock mechanism for feeding said strip; said means being adapted upon the subjection of the device to vibration to feed said strip at a greater rate of speed than when the device is not subjected to vibrations; recording means adapted for operation upon and transversely of said strip; and horological graduations on said strip coöperative with the markings of said recording means; and an operative connection between said recording means and said clock mechanism, substantially as described.

8. In a device of the class described, the combination of a casing having a portion of its wall transparently formed; a clock mechanism mounted in said casing; a movable record strip mounted in said casing and visible through said transparent portion of the wall of said casing; means operatively connected with said clock mechanism for feeding said strip, said means being adapted upon the subjection of the device to vibration to feed said strip at a greater rate of speed than when the device is not subjected to vibrations; pointed recording members adapted for operation upon and transversely of said strip; an operative connection between said members and said clock mechanism; and horological graduations on the exposed side of said strip for coöperation with the markings of said recording members, substantially as described.

9. In a device of the class described, the combination of a casing; a clock mechanism mounted in said casing; a movable record-strip mounted in said casing and visible from without; means operatively connected with said clock mechanism for feeding said strip, said means being adapted when the device is silent to feed said strip at a comparatively low uniform speed, the same being adapted upon the subjection of said device to vibration to feed said strip at a variable increased speed; oscillatory pointed recording members adapted for operation upon and transversely of said strip; an operative connection between said recording members and said clock mechanism; and horological graduations and markings upon said strip for coöperation with the markings of said recording members, substantially as described.

10. In a device of the class described, the combination of a casing having a transparent peripheral wall; a clock mechanism mounted in said casing; a movable record-strip mounted in said casing and visible through said transparent wall; means operatively connected with said clock mechanism for feeding said strip; said means being adapted when the device is not subjected to vibration to feed said strip at a comparatively slow uniform speed, the same being adapted upon the subjection of the device to vibration to feed said strip at a variable increased speed; oscillatory recording levers adapted for operation upon and transversely of said recording-strip; and an operative connection between said levers and said clock mechanism whereby one of said levers will be constantly oscillated at a comparatively high speed and the other intermittently operating at a comparatively low rate of speed, substantially as described.

11. In a device of the class described, the combination of a casing; a clock mechanism mounted in said casing; a movable record-strip mounted in said casing and visible from without; a driving connection between said clock mechanism and said strip whereby said strip may be constantly driven at a comparatively low uniform speed; driving means operatively connected with said clock mechanism for feeding said strip at an increased speed; means governing the operation of said last mentioned means whereby, when the device is not subjected to vibrations, said driving means will be inert, and whereby, upon the subjection of said device to vibration, operation of said driving means will be permitted to effect the feeding of said strip at a variable increased speed; recording means adapted for operation upon and transversely of said strip; and an operative connection between said means and said clock mechanism, substantially as described.

12. In a device of the class described, the combination of a casing; a clock mechanism mounted in said casing; a movable record strip having its ends coiled upon spools arranged in said casing; means for feeding said strip; a driving connection between said means and said clock mechanism whereby said strip may be constantly driven at a comparatively low uniform speed; driving gearing for said record-strip feeding means in geared connection with said clock mechanism; means governing the escapement of said gearing whereby, upon the subjection of said device to vibration, escapement of said driving means will be permitted to effect the feeding of said strip at an increased speed; pointed recording members adapted for operation upon and transversely of said strip; an operative connection between said means and said clock mechanism; and horological graduations and markings on the exposed side of said strip for coöperation with the markings of said recording members, substantially as described.

13. In a device of the class described, the combination of a casing; a clock mechanism mounted in said casing, a portion of the wall of said casing being transparent; a movable record-strip having its ends coiled upon spools mounted in said casing, the same being visible through the transparent wall of said casing; means for feeding said strip; a driving connection between said means and said clock mechanism whereby said strip may be constantly driven at a comparatively low uniform speed; driving gearing for said record-strip feeding means in gear connection with said clock mechanism; means governing the operation of said gearing whereby, when the device is silent, said driving means will be inert, and whereby, upon the subjection of said device to vibration, operation of said driving means will be permitted to effect the feeding of said strip at a variable increased speed; oscillatory recording levers having points adapted to engage the back or inner surface of said strip; and an operative connection between said levers and said clock mechanism whereby one of said levers will be constantly oscillated and the other intermittently operated, substantially as described.

14. In a device of the class described, the combination of a casing; a clock mechanism mounted in said casing; a movable record-strip visible from without and having its ends coiled upon spools mounted in said casing; a friction roller for feeding said strip; a driving connection between said roller and said clock mechanism whereby said strip may be constantly driven at a comparatively low uniform speed; driving gearing for said feeding roller in gear connection with said clock mechanism; means governing the operation of said gearing whereby, when the device is silent, said driving gearing will be inert, and whereby, upon the subjection of said device to vibration, operation of said driving gearing will be permitted to effect the feeding of said strip at a variable increased rate of speed; oscillatory levers having points adapted to traverse said strip; and an operative connection between said lever and said clock mechanism, substantially as described.

15. In a device of the class described, the combination of a casing; a clock mechanism mounted in said casing; a movable record-strip visible from without and having its ends coiled upon spools mounted in said casing; a friction roller for feeding said strip; a driving connection between said roller and said clock mechanism whereby said strip may be constantly driven at a comparatively low uniform speed; driving gearing for said feeding roller in gear connection with said clock mechanism; means governing the operation of said gearing whereby, when the device is not subjected to vibrations, said driving gearing will be inert, and whereby, upon the subjection of said device to vibration, operation of said driving gearing will be permitted to effect the feeding of said strip at a variable increased rate of speed; two oscillatory recording levers having points adapted to operate upon the inner surface of said strip and transversely thereof; an operative connection between said levers and said clock mechanism whereby one of said levers will be constantly oscillated at a constant and uniform rate of speed, and the other lever regularly intermittently operated; and horological graduations and markings on said strip for coöperation with the markings of said recording levers, substantially as described.

16. In a device of the class described, the combination of a casing having a transparent peripheral wall; a clock mechanism mounted in said casing; a movable record strip having its ends coiled upon spools arranged in said casing, the same being positioned for exposure at said transparent wall portion of said casing; a friction roller for feeding said strip; a driving connection between said friction roller and said clock mechanism, whereby said strip may be constantly driven at a comparatively low uniform speed; driving gearing for said feeding roller; a friction gear connection between said driving gearing and said clock mechanism; means governing the operation of said gearing whereby, upon the subjection of the device to vibration, operation of said feeding roller will be permitted to effect the feeding of said strip at an increased variable speed; oscillatory recording levers having points adapted to engage one side of said strip to travel thereon transversely thereof; and an operative connection between said levers and said clock mechanism whereby one of said levers will be constantly oscillated and the other intermittently operated, substantially as described.

17. In a device of the class described, the combination of a casing; a clock mechanism mounted in said casing; a movable record-strip mounted in said casing and visible from without; a driving connection between said clock mechanism and said strip whereby said strip may be constantly driven at a comparatively low uniform speed; driving means operatively connected with said clock mechanism for feeding said strip at an increased speed; means governing the operation of said last mentioned means whereby, when the device is silent, said driving means will be inert, and whereby, upon the subjection of said device to vibration, escapement of said driving means will be permitted; oscillatory recording levers having points adapted to engage one side of said strip and to travel thereon transversely thereof; and an operative connection between said levers and said clock mechanism whereby one of said levers will be constantly uniformly oscillated and the other intermittently uniformly operated, substantially as described.

18. In a device of the class described, the combination of a casing; a clock mechanism mounted in said casing; indicating hands connected with said mechanism and co-acting with a dial on the front side of said casing; setting means operable from the rearward side of said casing for rotating said hands in a counter-clockwise direction; setting means operable from the front side of said casing for rotating said hands in a clockwise direction; a movable recording-strip mounted in said casing and visible from without; means operatively connected with said clock mechanism for feeding said strip, said means being adapted upon the subjection of the device to vibration to feed said strip at a greater rate of speed than when the device is not subjected to vibrations; pointed recording members adapted for operation upon and transversely of said strip; an operative connection between said recording members and said clock mechanism; and horological graduations on the exposed side of said strip for coöperation with the markings of said recording members, substantially as described.

19. In a device of the class described, the combination of a casing; a clock mechanism mounted in said casing; a peripheral wall of said casing being transparent; a movable recording-strip visible through said transparent wall; a spring operable receiving spool and a loosely paying-out spool, the respective ends of said strip being coiled upon said spools; a friction roller for feeding said strip; a driving connection between said roller and said clock mechanism whereby said strip may be constantly driven at a comparatively low uniform speed; driving gearing for said feeding roller in frictional gear connection with said clock mechanism; means governing the operation of said driving gearing whereby, when the device is not subjected to vibrations, said driving gearing will be inert, and whereby upon the subjection of said device to vibration, operation of said driving gearing will be permitted to effect the feeding of said strip at a variable increased rate of speed: and oscillatory recording means adapted to operate upon said strip transversely thereof; and an operative connection between said recording means and said clock mechanism, substantially as described.

In testimony whereof I have signed my name to this specification in the presence of two subscribing witnesses.

HERMAN J. SUELZEN.

Witnesses:
 HELEN F. LILLIS,
 JANET E. HOGAN.